(12) United States Patent
Goetz et al.

(10) Patent No.: US 9,766,923 B2
(45) Date of Patent: *Sep. 19, 2017

(54) PREVENTING UNSAFE SHARING THROUGH CONFINEMENT OF MUTABLE CAPTURED VARIABLES

(71) Applicant: Oracle International Corporation, Redwood City, CA (US)

(72) Inventors: Brian Goetz, Williston, VT (US); Alexander R. Buckley, Cupertino, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/223,492

(22) Filed: Mar. 24, 2014

(65) Prior Publication Data

US 2014/0208323 A1    Jul. 24, 2014

Related U.S. Application Data

(63) Continuation of application No. 13/028,104, filed on Feb. 15, 2011, now Pat. No. 8,782,644.

(51) Int. Cl.
  *G06F 9/46*    (2006.01)
  *G06F 9/44*    (2006.01)

(52) U.S. Cl.
  CPC .................. *G06F 9/46* (2013.01); *G06F 8/31* (2013.01); *G06F 9/461* (2013.01)

(58) Field of Classification Search
  None
  See application file for complete search history.

(56) References Cited

U.S. PATENT DOCUMENTS

| 6,119,145 A * | 9/2000 | Ikeda ..................... G06F 9/461 707/999.008 |
| 2002/0040470 A1 * | 4/2002 | Guthrie ................. G06F 8/4442 717/126 |
| 2005/0278374 A1 * | 12/2005 | Patrick .............. G06F 17/30286 |
| 2010/0122073 A1 | 5/2010 | Narayanaswamy et al. |

OTHER PUBLICATIONS

Mike Clark, "Using Blocks in ios4: The Basics", The Pragmatic Studio, Jul. 28, 2010. http://pragmaticstudio.com/blog/2010/7/28/ios4-blocks-1.

* cited by examiner

*Primary Examiner* — Emerson Puente
*Assistant Examiner* — Steven Do
(74) *Attorney, Agent, or Firm* — Park, Vaughan, Fleming & Dowler LLP (57) ABSTRACT

The disclosed embodiments provide a system that facilitates the development and execution of a software program. During operation, the system provides a mechanism for restricting a variable to a runtime context in the software program. Next, the system identifies the runtime context during execution of the software program. Finally, the system uses the mechanism to prevent incorrect execution of the software program by ensuring that a closure capturing the variable executes within the identified runtime context.

18 Claims, 5 Drawing Sheets

PREVENTING UNSAFE SHARING THROUGH CONFINEMENT OF MUTABLE CAPTURED VARIABLES

RELATED APPLICATION

This application is a continuation of, and hereby claims priority under 35 U.S.C. §120 to, pending U.S. patent application Ser. No. 13/028,104, entitled "Preventing Unsafe Sharing Through Confinement of Mutable Captured Variables," by inventors Brian Goetz and Alexander R. Buckley, filed on 15 Feb. 2011.

BACKGROUND

Field

The disclosed embodiments relate to closure mechanisms in programming languages. More specifically, the disclosed embodiments relate to techniques for preventing the unsafe sharing of mutable captured variables by closures in software programs.

Related Art

Some programming languages allow for the capture of variables within the lexical scope of closures, as well as the mutation of those variables at deeper points in the call chain and/or by different threads. However, mutation of captured variables may lead to race conditions and/or atomicity failures if the corresponding closures are executed concurrently (e.g., in multiple threads, processors, and/or processor cores).

Hence, what is needed is a mechanism for avoiding unsafe sharing of mutable captured variables in multithreaded environments.

SUMMARY

The disclosed embodiments provide a system that facilitates the development and execution of a software program. During operation, the system provides a mechanism for restricting a variable to a runtime context in the software program. Next, the system identifies the runtime context during execution of the software program. Finally, the system uses the mechanism to prevent incorrect execution of the software program by ensuring that a closure capturing the variable executes within the identified runtime context.

In some embodiments, the mechanism declaratively restricts the variable to the runtime context using a keyword in source code for the software program.

In some embodiments, the runtime context is identified using a first context identifier associated with creation of the closure. To ensure that the closure executes within the identified runtime context, the system performs a comparison using the first context identifier and a second context identifier associated with execution of the closure. If the comparison indicates that the second context identifier corresponds to the identified runtime context, the system permits execution of the closure in the software program.

In some embodiments, the first context identifier is obtained from an argument to a function representing the closure or a frame object containing the variable.

In some embodiments, the comparison includes an equality operation on the first and second context identifiers or a bitwise operation using the first or second context identifiers.

In some embodiments, if the comparison indicates that the second context identifier does not correspond to the identified context, the system ensures that the closure executes within the identified runtime context by:
  (i) raising an exception during execution of the software program; or
  (ii) modifying execution of the closure so that the closure executes within the identified runtime context.

In some embodiments, the mechanism is used to prevent incorrect execution of the software program during at least one of:
  (i) entry to the body of the closure;
  (ii) reading of the variable by the closure; and
  (iii) writing to the variable by the closure.

In some embodiments, the runtime context corresponds to a thread, a processor, or a processor core.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Embodiments provide a method and system for facilitating the development and execution of a software program. More specifically, embodiments provide a mechanism for avoiding unsafe sharing of mutable captured variables by closures in a software program. The mechanism may restrict each captured variable to a runtime context, such as a thread, processor, and/or processor core. For example, the mechanism may declaratively restrict a captured variable to the runtime context using a keyword in source code for the software program.

The runtime context may then be identified during execution of the software program. In particular, the runtime context may be identified by obtaining a first context identifier associated with creation of the closure. The mechanism may then be used to prevent the incorrect execution of the software program by ensuring that a closure capturing the variable executes within the identified runtime context.

To detect and prevent incorrect execution of the software program, the first context identifier may be compared with a second context identifier associated with execution of the closure. If the comparison indicates that the second context identifier corresponds to the identified runtime context, execution of the closure in the software program may be permitted. If the comparison indicates that the second context identifier does not correspond to the identified runtime context, an action may be performed to ensure execution of the closure within the identified runtime context. The action may raising an exception during execution of the software program and/or modifying execution of the closure so that the closure executes within the identified runtime context.

Figure 1:
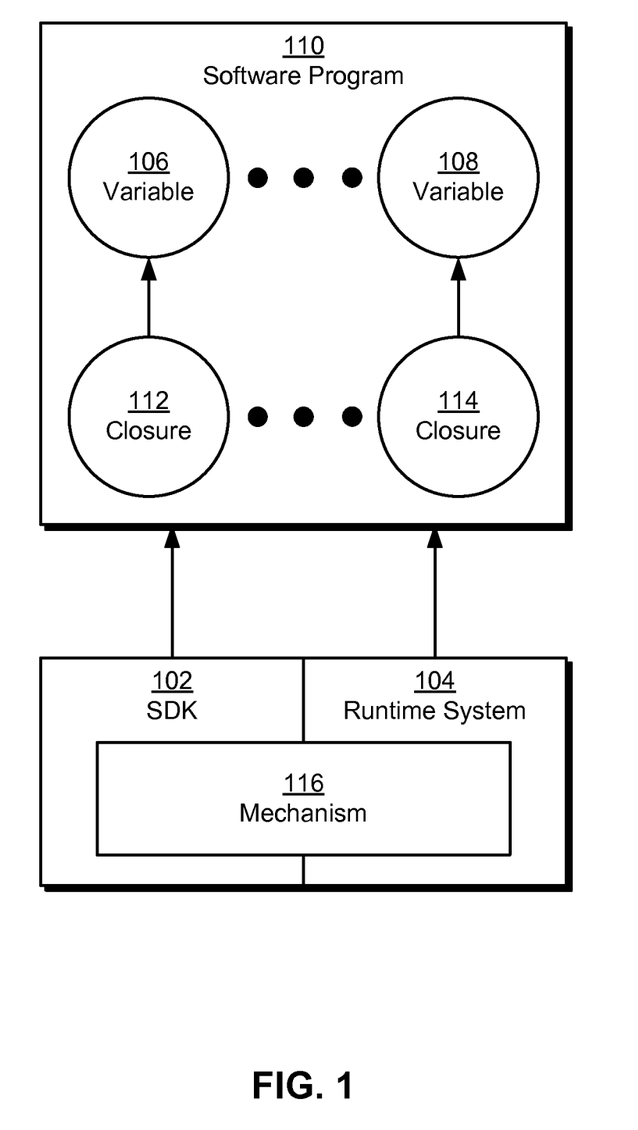
FIG. 1 shows a schematic of a system in accordance with an embodiment.

FIG. 1 shows a schematic of a system in accordance with an embodiment. As shown in FIG. 1, a software development kit (SDK) 102 and a runtime system 104 may be used to manage the development and execution of a software program 110. For example, SDK 102 and runtime system 104 may correspond to the Java (Java™ is a registered trademark of Oracle America, Inc.) Development Kit (JDK) and Java Runtime Environment (JRE).

Software program 110 may correspond to a standalone application, operating system, enterprise application, database, library, device driver, and/or other type of software. In addition, software program 110 may be executed in a variety of environments. For example, software program 110 may be executed on a single desktop computer or workstation, or software program 110 may be distributed across multiple servers within a data center. Along the same lines, software program 110 may be executed sequentially or in parallel on one or more processors and/or processor cores.

In one or more embodiments, software program 110 includes variables 106-108 (e.g., free variables) that are captured by closures 112-114. For example, the following source code may calculate a sum from values in a list of elements:

```
int total = 0;
list.forEach({Foo x => total += x.foo( ); });
System.out.println(total);
```

Within the example, the "total" variable is captured (e.g., closed over) by the closure in the second line, which computes the sum by iterating over the elements and adding their "foo" values to "total" within a "forEach" method.

Those skilled in the art will appreciate that concurrent execution of a closure that captures a variable may result in data races and/or atomicity failures.

Continuing with the above example, the "forEach" method may correspond to a library abstraction that uses one thread to sequentially apply the closure to each element in the list. Alternatively, the "forEach" method may apply the closure to multiple elements in parallel using multiple threads, processors, and/or processor cores, thus causing data races on the "total" variable if access to the variable by the thread is not protected by mutual exclusion. In other words, the "forEach" method may behave non-deterministically and/or execute in a way that results in an incorrect value for the "total" variable compared to sequentially applying the closure to each element in the list.

In one or more embodiments, SDK 102 and runtime system 104 provide a mechanism 116 that prevents unsafe sharing of variables 106-108 captured by closures 112-114. In particular, mechanism 116 may restrict each variable 106-108 to a runtime context in software program 110. The runtime context may correspond to a thread, processor core, and/or processor within which software program 110 executes.

During execution of software program 110, the runtime context may be identified (e.g., by runtime system 104) and used to ensure that the closure capturing the variable executes within the identified runtime context. For example, mechanism 116 may be used by SDK 102 and/or runtime system 104 to ensure that the closure is executed in the thread in which the closure was created. Use of mechanism 116 to prevent incorrect execution of software program 110 is discussed in further detail below with respect to FIG. 2.

Figure 2:
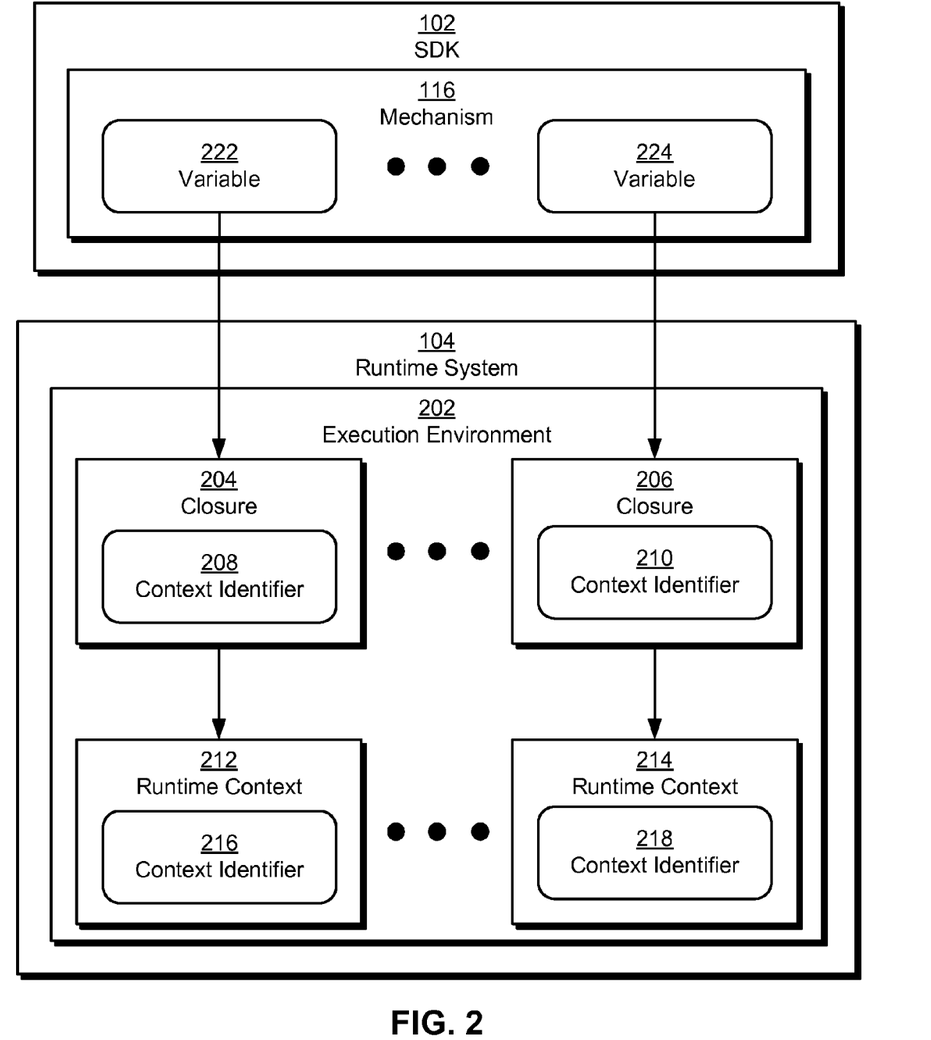
FIG. 2 shows the use of a mechanism to prevent incorrect execution of a software program in accordance with an embodiment.

FIG. 2 shows the use of mechanism 116 to prevent incorrect execution of a software program (e.g., software program 110 of FIG. 1) in accordance with an embodiment. As discussed above, SDK 102 and/or runtime system 104 may use mechanism 116 to ensure that closures 204-206 that capture variables 222-224 in the software program execute within specific runtime contexts 212-214.

More specifically, mechanism 116 may avoid unsafe sharing of variables 222-224 by enabling the restriction of each captured variable to a runtime context (e.g., using SDK 102). As mentioned previously, the runtime context may correspond to a specific thread, processor core, and/or processor. Next, the runtime context may be identified during execution of the software program (e.g., by runtime system 104). Finally, mechanism 116 may be used to prevent incorrect execution of the software program by ensuring that a closure capturing the variable executes within the identified runtime context.

As shown in FIG. 2, variables 222-224 captured by closures 204-206 may be restricted to runtime contexts 212-214 using context identifiers for the runtime contexts. More specifically, an execution environment 202 (e.g., JRE) for the software program may provide a first context identifier 208-210 for a runtime context associated with the creation of a closure that captures a variable in the software program. As discussed below, the first context identifier may be obtained from an argument to a function containing the closure and/or a frame object containing the variable.

In one or more embodiments, the first context identifier is associated with a thread, processor, and/or processor core. For example, the first context identifier may correspond to a numeric value that uniquely identifies the thread used to create the closure. A thread-specific runtime context may thus be identified by the numeric value, while a processor- or processor-core-specific runtime context may be identified using one or more digits and/or bits of the numeric value.

To ensure that the closure executes within the identified runtime context, the first context identifier may be compared with a second context identifier 216-218 for a runtime context 212-214 associated with execution of the closure. Runtime system 104 may permit execution of the closure as-is if the comparison indicates that the second context identifier corresponds to the identified runtime context. On the other hand, if the comparison indicates that the second context identifier does not correspond to the identified runtime context, runtime system 104 may raise an exception during execution of the software program and/or modify execution of the closure so that the closure executes within the identified runtime context.

Referring to FIG. 2, runtime system 104 may restrict variable 222 to a given runtime context during entry to the body of closure 204, reading of variable 222 by closure 204, and/or writing to variable 222 by closure 204. First, runtime system 104 may obtain a context identifier 216 from runtime context 212 and compare context identifier 216 with context identifier 208 to determine if the two context identifiers correspond to the same runtime context (e.g., runtime context 212). For example, runtime system 104 may perform the comparison by applying an equality operation and/or bitwise operation (e.g., AND, OR, XOR, etc.) on context identifiers 208 and 216. If the comparison indicates that runtime context 212 is used to both create and execute closure 204, runtime system 104 may permit execution of closure 204 within execution environment 202.

However, runtime system 104 may detect concurrent execution of closure 204 within multiple runtime contexts if the comparison indicates that runtime context 212 differs from the runtime context used to create closure 204. For example, each runtime context 212-214 may be uniquely identified by the corresponding context identifier 216-218. Consequently, a mismatch between runtime context 212 and the runtime context corresponding to context identifier 208 may indicate that closure 204 is executing within both runtime contexts at the same time.

Because such concurrent execution may lead to data races and/or atomicity failures, runtime system 104 may detect and prevent unsafe sharing of closure 204 by raising an exception during execution of the software program and/or modifying execution of closure 204. For example, runtime system 104 may discontinue execution of the software program with an error code corresponding to concurrent execution of closure 204 within multiple runtime contexts, or runtime system 104 may avoid incorrect execution of closure 204 by merging the multiple runtime contexts (e.g., threads) into a single runtime context.

Runtime system 104 may continue managing the execution of closures in the software program in similar ways. For example, runtime system 104 may restrict variable 224 to a specific runtime context by obtaining context identifier 210 using closure 206 and context identifier 218 from runtime context 214, performing a comparison using the context identifiers, and executing closure 206 within execution environment 202 based on the comparison.

In one or more embodiments, mechanism 116 declaratively restricts each variable to a specific runtime context using a keyword in source code for the software program. For example, the source code above may be modified using a "confined" keyword to restrict the "total" variable to a runtime context:

```
confined int total = 0;
list.forEach({Foo x => total += x.foo( ); });
System.out.println(total);
```

In other words, SDK 102 may allow variables captured by closures to be declared during development of the software program using the "confined" keyword.

The "confined" keyword may then cause the source code to be compiled in the following exemplary way:

```
Frame f = new IFrame(0);
list.forEach(C#closure.bind(f,
    Thread.currentThread( )).asSam(Block.class));
System.out.println(f.i0);
```

More specifically, the "total" variable may be hoisted into a Frame object (e.g., stack frame, activation record, etc.) on the heap, and the body of the closure may be compiled into a static method named "closure" in class "C." A method reference "C#closure" may be used to obtain an object representing the closure that is then passed to the "forEach" method. Because the closure body accesses "total," the object representing the closure may be initialized with the Frame object "f." Namely, "f" may be "bound" as the first argument to the "closure" method. Furthermore, the thread identifier (ID) (e.g., "Thread.currentThread( )") of the thread that dynamically creates the closure object may be "bound" as the second argument to the "closure" method.

In turn, the static method may use the argument to ensure that the ID of the thread in which the closure executes is the same as the ID of the permissible thread provided by the closure's creator:

```
static void closure(IFrame frame, Thread thread, Foo x) {
    if (thread != Thread.currentThread( ))
        throw new VariableConfinementException( );
    frame.i0 += x.foo( );
}
```

Alternatively, the thread ID of the closure's creator may be embedded in the Frame object rather than passed as a separate argument to the method.

A language-level exception (e.g., "java.lang.VariableConfinementException") may thus be thrown if the thread IDs do not match to indicate that the closure is executing in a different thread from that of the closure's creator (e.g., "off thread"). On the other hand, execution of the closure may be modified (e.g., by terminating threads with thread IDs that do not match the thread ID of the closure's creator) so that the closure executes within the thread used to create the closure (e.g., "on thread"). As described above, the thread IDs may be compared in other ways (e.g., using binary operations) to ensure that the closure executes within a non-thread-based runtime context. For example, a binary operation may be used during the comparison to ascertain if the thread used to execute the closure is associated with the same processor and/or processor core as the thread used to create the closure.

While the discussion of mechanism 116 above relates to declarative restriction of captured variables to runtime contexts, mechanism 116 may utilize a number of other methods for maintaining the "on-thread" execution of closures that capture variables. For example, mechanism 116 may provide a keyword that allows closures (e.g., closures 204-206) in the software program to be identified instead of captured variables. If a closure identified by the keyword also captures a variable in the software program, SDK 102 and/or runtime system 104 may restrict execution of the closure to one runtime context.

Those skilled in the art will appreciate that runtime system 104 may define and/or manage runtime contexts in various ways. For example, a runtime context for executing a distributed software program may correspond to a host on a network, while a runtime context for executing a software program in a parallel-computing environment may correspond to the number of concurrent processors and/or processor cores supported by the parallel-computing environment. As a result, a closure may be executed in parallel (e.g., to iterate over a list) if runtime system 104 and/or execution environment 202 support mutually exclusive mutation of captured variables. Conversely, a closure may be executed serially if mutually exclusive mutation of captured variables is not supported and/or each iteration of the closure depends on the result(s) of previous iterations.

In one or more embodiments, the system of FIG. 2 includes functionality to characterize a closure based on the types of variables bound by the closure. The closure may then be executed (e.g., serially or in parallel) based on the characterization. Characterization of closures to facilitate execution of the closures is discussed in a co-pending non-provisional application by the same inventors as the instant application and filed on the same day as the instant application, entitled "Binding-Based Characterization of Closures in Software Programs," having ser. no. 13/028,111, and filing date Feb. 15,2011, which is incorporated herein by reference.

Figure 3:
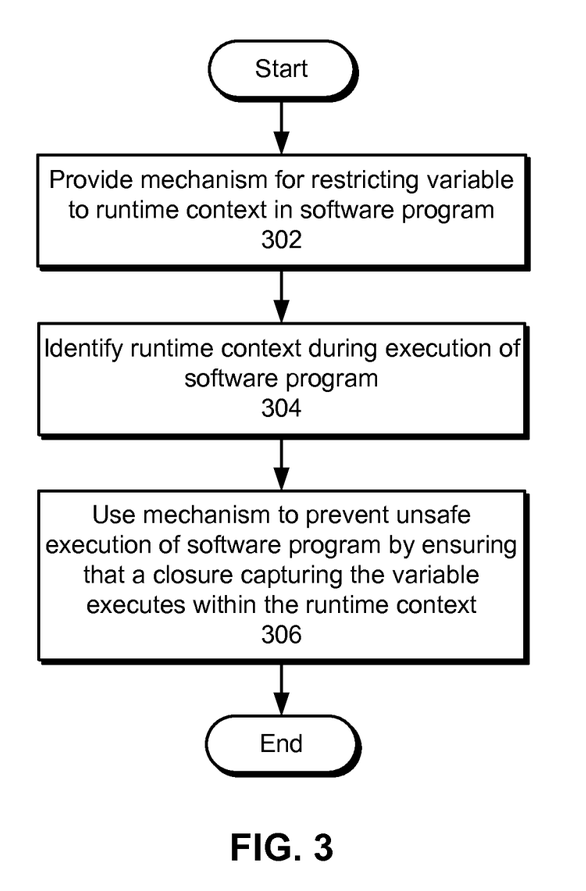
FIG. 3 shows a flowchart illustrating the process of facilitating the development and execution of a software program in accordance with an embodiment.

FIG. 3 shows a flowchart illustrating the process of facilitating the seembodiment. In one or more embodiments, one or more of the steps may be omitted, repeated, and/or performed in a different order. Accordingly, the specific arrangement of steps shown in FIG. 3 should not be construed as limiting the scope of the embodiments.

Initially, a mechanism is provided for restricting a variable to a runtime context in the software program (operation 302). The runtime context may correspond to a thread, processor, and/or processor core used to execute the software program. The mechanism may correspond to a keyword that declaratively restricts the variable to the runtime context. For example, the variable may be restricted by including a "confined" keyword in source code for the software program during development of the software program.

Next, the runtime context is identified during execution of the software program (operation 304). The runtime context may be identified from an argument to a function containing the closure and/or a Frame object containing the variable. Finally, the mechanism is used to prevent incorrect execution of the software program by ensuring that a closure capturing the variable executes within the identified runtime context (operation 306). The mechanism may be used to prevent incorrect execution during entry to the body of the closure, reading of the variable by the closure, and/or writing to the variable by the closure. Use of the mechanism to ensure that the closure executes within the identified runtime context is discussed in further detail below with respect to FIG. 4.

Figure 4:
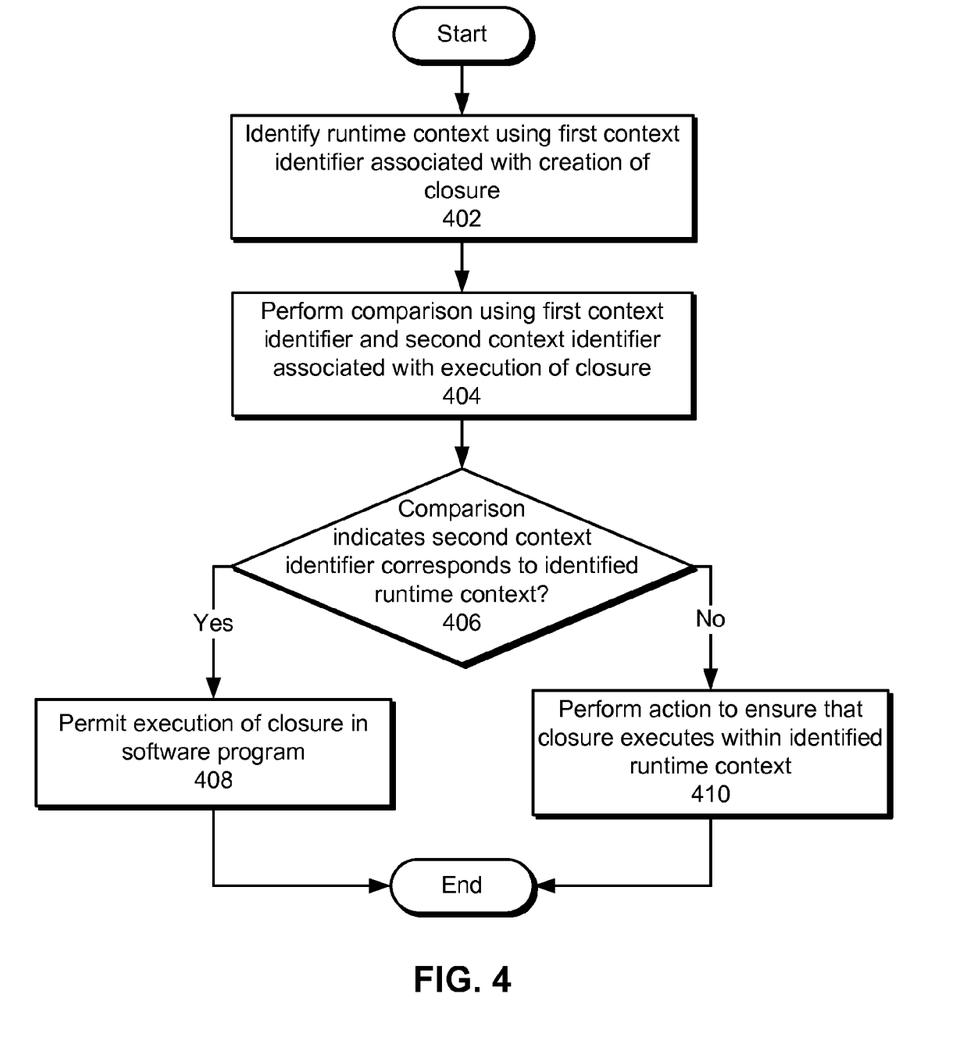
FIG. 4 shows a flowchart illustrating the process of ensuring that a closure executes within an identified runtime context in accordance with an embodiment.

FIG. 4 shows a flowchart illustrating the process of ensuring that a closure executes within an identified runtime context in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

First, the runtime context is identified using a first context identifier associated with creation of the closure (operation 402). For example, the first context identifier may be obtained as a thread ID of a thread used to create the closure. In addition, the first context identifier may be obtained from an argument to a function containing the closure and/or a frame object containing the variable.

Next, a comparison is performed using the first context identifier and a second context identifier associated with execution of the closure (operation 404). For example, the second context identifier may be obtained as the thread ID of a thread used to execute the closure. The comparison may additionally include an equality operation on the first and second context identifiers and/or a bitwise operation using the first and/or second context identifiers. For example, on-thread execution of the closure may be determined by examining the thread ID of the closure's creating thread for a match with the thread ID of the closure's executing thread. Conversely, creation and execution of the closure within the same processor and/or processor core may be ascertained by comparing specific bits from each context identifier (e.g., using a bitwise-AND operation and a mask value).

The comparison may indicate whether the second context identifier corresponds to the identified runtime context (operation 406). If the comparison shows that the second context identifier corresponds to the identified runtime context (e.g., the closure is being executed serially), execution of the closure in the software program is permitted (operation 408). On the other hand, if the comparison indicates that the second context identifier does not correspond to the identified runtime context, an action is performed to ensure that the closure executes within the identified runtime context (operation 410). For example, an exception may be raised during execution of the software program, and/or execution of the closure may be modified so that the closure executes within the identified runtime context.

Figure 5:
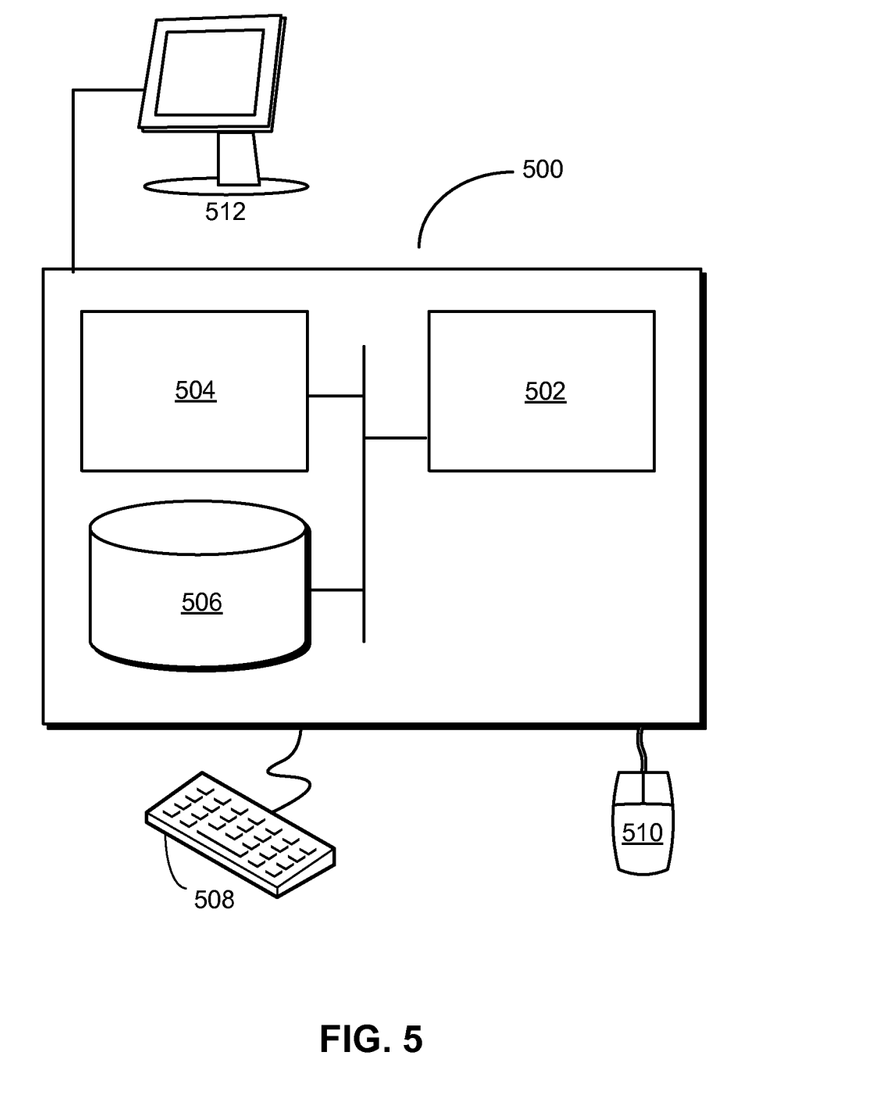
FIG. 5 shows a computer system in accordance with an embodiment.

FIG. 5 shows a computer system 500 in accordance with an embodiment. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating the development and execution of a software program. The system may include a mechanism for restricting a variable to a runtime context in the software program. The system may also include a runtime system that identifies the runtime context during execution of the software program and uses the mechanism to prevent incorrect execution of the software program by ensuring that a closure capturing the variable executes within the identified runtime context.

In addition, one or more components of computer system 500 may be remotely located and connected to the other components over a network. Portions of the present embodiments (e.g., mechanism, runtime system, etc.) may also be located on different nodes of a distributed system that implements the embodiments. For example, the present embodiments may be implemented using a cloud computing system that remotely manages the development and execution of software programs.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating development and execution of a software program, comprising:
    during execution of the software program:
        receiving a first context identifier that identifies a creation runtime context and a creation thread that are used to create a closure that captures a variable;
        receiving a second context identifier that identifies a subsequent-execution runtime context and a subsequent-execution thread for a subsequent execution of the closure; and
        preventing unsafe sharing of variables captured by closures by ensuring that the subsequent-execution runtime context corresponds to the creation runtime context by:
            in response to determining that the first context identifier does not correspond to the second context identifier, preventing the unsafe sharing of variables captured by closures by merging the creation runtime context and the subsequent-execution runtime context into a single merged context and executing the single merge context by a single thread.

2. The computer-implemented method of claim 1, wherein the method declaratively restricts the variable to the runtime context in the software program using a keyword in source code for the software program.

3. The computer-implemented method of claim 1, wherein the first context identifier is obtained from at least one of:
    an argument to a function representing the closure; and
    a frame object containing the variable.

4. The computer-implemented method of claim 1, wherein while determining that the first context identifier does not correspond to the second context identifier, the method performs a comparison, which includes at least one of:
    an equality operation on the first and second context identifiers; and
    a bitwise operation using the first or second context identifiers.

5. The computer-implemented method of claim 1, wherein preventing the unsafe sharing of variables captured by closures comprises raising an exception during the execution of the software program.

6. The computer-implemented method of claim 1, wherein the mechanism is used to prevent incorrect execution of the software program during at least one of:
    entry to the body of the closure;
    reading of the variable by the closure; and
    writing to the variable by the closure.

7. The computer-implemented method of claim 1, wherein at least one of the creation runtime context and the subsequent-execution runtime context corresponds to at least one of a thread, a processor, and a processor core.

8. A system for facilitating development and execution of a software program, comprising:
    a mechanism for restricting a variable to a runtime context in the software program; and
    a runtime system configured to, during execution of the program:
        receive a first context identifier that identifies a creation runtime context and a creation thread that are used to create a closure that captures the variable;
        receive a second context identifier that identifies a subsequent-execution runtime context and a subsequent-execution thread for a subsequent execution of the closure; and
        use the mechanism to prevent the software program from unsafely sharing variables captured by closures by ensuring that the subsequent-execution runtime context corresponds to the creation runtime context by:
            in response to determining that the first context identifier does not correspond to the second context identifier, prevent the software program from unsafely sharing variables captured by closures by merging the creation runtime context and the subsequent-execution runtime context into a single merged context and executing the single merge context by a single thread.

9. The system of claim 8, wherein the mechanism declaratively restricts the variable to the runtime context in the software program using a keyword in source code for the software program.

10. The system of claim 8, wherein while determining that the first context identifier does not correspond to the second context identifier the, method performs a comparison, which includes at least one of:
    an equality operation on the first and second context identifiers; and
    a bitwise operation using the first or second context identifiers.

11. The system of claim 8, wherein preventing the software program from unsafely sharing variables captured by closures comprises raising an exception during the execution of the software program.

12. The system of claim 8, wherein the mechanism is used to prevent incorrect execution of the software program during at least one of:
    entry to the body of the closure;
    reading of the variable by the closure; and
    writing to the variable by the closure.

13. The system of claim 8, wherein at least one of the runtime context that is used to create the closure and the subsequent-execution runtime context corresponds to at least one of a thread, a processor, and a processor core.

14. A non-transitory computer-readable storage medium storing instructions that when executed by a computer cause the computer to perform a method for facilitating the development and execution of a software program, the method comprising:
    providing a mechanism for restricting a variable to a runtime context in the software program;
    during execution of the software program:

receiving a first context identifier that identifies a creation runtime context and a creation thread that are used to create a closure that captures the variable;

receiving a second context identifier that identifies a subsequent-execution runtime context and a subsequent-execution thread for a subsequent execution of the closure; and preventing the software program from unsafe sharing of variables captured by closures by ensuring that the subsequent-execution runtime context corresponds to the creation runtime context by:

in response to determining that the first context identifier does not correspond to the second context identifier, preventing the unsafe sharing of variables captured by closures within the subsequent-execution runtime context by merging the creation runtime context and the subsequent-execution runtime context into a single merged context and executing the single merge context by a single thread.

15. The computer-readable storage medium of claim 14, wherein preventing the unsafe sharing of variables captured by closures comprises raising an exception during the execution of the software program.

16. The computer-readable storage medium of claim 14, wherein the mechanism is used to prevent incorrect execution of the software program during at least one of:
   entry to a body of the closure;
   reading of the variable by the closure; and
   writing to the variable by the closure.

17. The computer-readable storage medium of claim 14, wherein the mechanism declaratively restricts the variable to the runtime context in the software program using a keyword in source code for the software program.

18. The computer-implemented method of claim 1, wherein modifying the execution of the closure comprises terminating the subsequent-execution thread.

* * * * *

UNITED STATES PATENT AND TRADEMARK OFFICE
CERTIFICATE OF CORRECTION

PATENT NO. : 9,766,923 B2
APPLICATION NO. : 14/223492
DATED : September 19, 2017
INVENTOR(S) : Goetz et al.

It is certified that error appears in the above-identified patent and that said Letters Patent is hereby corrected as shown below:

In the Specification

Column 3, Line 36, please delete, "raising", and replace with --raise--

Column 7, Line 37, please delete, "seembodiment", and replace with --embodiment--

Signed and Sealed this
Fourth Day of December, 2018

Andrei Iancu
*Director of the United States Patent and Trademark Office*